(12) United States Patent
Datta et al.

(10) Patent No.: US 11,288,168 B2
(45) Date of Patent: Mar. 29, 2022

(54) PREDICTIVE SOFTWARE FAILURE DISCOVERY TOOLS (71) Applicant: PayPal, Inc., San Jose, CA (US)

(72) Inventors: Indrajit Datta, Scottsdale, AZ (US); Scott Turley, Tempe, AZ (US); Joshua Birk, Sun City, AZ (US); Siew Wong, Chandler, AZ (US)

(73) Assignee: PayPal, Inc., San Jose, CA (US)

( * ) Notice: Subject to any disclaimer, the term of this patent is extended or adjusted under 35 U.S.C. 154(b) by 24 days.

(21) Appl. No.: 16/601,163

(22) Filed: Oct. 14, 2019

(65) Prior Publication Data
US 2021/0109843 A1 Apr. 15, 2021

(51) Int. Cl.
G06F 11/36 (2006.01)
G06F 9/54 (2006.01)
G06F 17/15 (2006.01)
G06K 9/62 (2006.01)

(52) U.S. Cl.
CPC ........... G06F 11/3636 (2013.01); G06F 9/54 (2013.01); G06F 17/15 (2013.01); G06K 9/6218 (2013.01)

(58) Field of Classification Search
None
See application file for complete search history.

(56) References Cited

U.S. PATENT DOCUMENTS 7,987,390 B2 * 7/2011 Chandrasekaran ......................... G06F 11/3688
714/38.1
9,009,539 B1 * 4/2015 Kompotis ............. G06F 11/079
714/38.1
10,182,129 B1 * 1/2019 Peterson ............. H04L 41/5009
2013/0311968 A1 * 11/2013 Sharma ............... G06F 11/3692
717/101
2014/0149967 A1 * 5/2014 Deshpande ......... G06F 11/3664
717/124

(Continued)

OTHER PUBLICATIONS

T. Dal Sasso, A. Mocci and M. Lanza, "Misery loves company: Crowdstacking traces to aid problem detection," 2015 IEEE 22nd International Conference on Software Analysis, Evolution, and Reengineering (SANER), Montreal, QC, 2015, pp. 131-140, doi: 10.1109/SANER.2015.7081823. (Year: 2015).*

(Continued)

Primary Examiner — Andrew M. Lyons
(74) Attorney, Agent, or Firm — Haynes and Boone, LLP (57) ABSTRACT A method for predicting software failure characteristics is discussed. The method includes accessing failure data and context data related to a failed software call into a software stack. The failure data indicates software call information. The context data indicates characteristics including functionality of the failed software call. The method includes accessing cluster data on previous software failures. The cluster data includes analyzed failure data and analyzed context data on software call traces. The analyzed failure data is provided by first and second failure tools. The cluster data for software calls is generated through respective instances of the software stack for each software call trace. The method also includes correlating the failed software call trace to a particular software call trace of the cluster data. The correlating is based at least on analysis of clusters indicated by the cluster data, the failure data, and the context data.

20 Claims, 6 Drawing Sheets (56) References Cited

U.S. PATENT DOCUMENTS

| | | | |
|---|---|---|---|
| 2017/0185475 A1* | 6/2017 | Dey | G06F 11/079 |
| 2017/0262360 A1* | 9/2017 | Kochura | G06F 11/3692 |
| 2019/0065346 A1* | 2/2019 | Krauss | G06F 9/547 |
| 2019/0340104 A1* | 11/2019 | V | G06F 11/3636 |
| 2019/0370106 A1* | 12/2019 | Boutnaru | G06F 11/0751 |
| 2020/0394329 A1* | 12/2020 | Jayaprakash | G06F 21/6245 |

OTHER PUBLICATIONS

T. Dal Sasso, A. Mocci and M. Lanza, "Misery loves company: CrowdStacking traces to aid problem detection," 2015 IEEE 22nd International Conference on Software Analysis, Evolution, and Reengineering (SANER), 2015, pp. 131-140, doi: 10.1109/SANER.2015.7081823. (Year: 2015).*

N. Maruyama and S. Matsuoka, "Model-based fault localization in large-scale computing systems," 2008 IEEE International Symposium on Parallel and Distributed Processing, 2008, pp. 1-12, doi: 10.1109/IPDPS.2008.4536310. (Year: 2008).*

* cited by examiner

PREDICTIVE SOFTWARE FAILURE DISCOVERY TOOLS

BACKGROUND

Embodiments of the present disclosure generally relate to the field of software failure discovery systems and, more particularly, to identification of software issues.

Software-based systems can include hundreds or thousands of software components that together can provide functionality to perform various processes and/or tasks. These software components can interface with each other to exchange data and/or control instructions, such as by using application programming interfaces (APIs), callbacks, and/or other mechanisms. The software components can be occasionally revised by software developers and then tested, prior to being used in a production environment. However, during development, testing, and/or use of the software-based system, software failures can occur. A software failure can occur anywhere during software calls that are executed through the hundreds of software components. As software systems get increasingly more complex, it is more difficult for developers and/or quality and control personnel to find, identify, and address these software issues.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and/or computer program products that embody techniques of the present disclosure. However, it is understood that the described embodiments may be practiced without these specific details. For example, although some examples refer to identifying relations between a current software failure and previous software call traces, other use cases are contemplated, such as determining customer issues based on a current failed software call trace, and/or determining previous failed software call traces based on type of use and/or customer issues associated with a current failure, among others.

A software-based system can include hundreds or thousands of software modules that provide functionality to accomplish various tasks and/or user functionality. As used in this application, a software stack is defined as a set of possible software modules that can be used to create a platform that can accomplish a common set of functions, and can refer to an overall software stack that includes all of the relevant stack subsets (such as a function specific stack subset and a common software stack).

For example, a first software stack (also referred to as a first stack portion or a first stack subset) can refer to a set of software modules needed for any customer related functions for a payment system that services such customers. Continuing with this example, the term a second software stack (also referred to as a second stack portion or a second stack subset) can refer to a certain set of software modules needed for any of merchant related functions for payment system that services such merchants. Furthermore, the first and second software stacks can share a common software stack that can provide common services, such as transaction processing and/or risk assessment functionality.

Software modules are typically integrated within the software stack such that they can work together, e.g., by allowing communication between these software modules via application programming interfaces (APIs), callbacks, and/or other mechanisms. The software stack typically allows software calls to be made using a certain entry point into the software stack. The initial software call can then be propagated throughout the software stack, such as by performing certain functions at each module, which then propagates through the software stack by calling one or more functions of other module(s). It is noted that the discussion of propagation of software calls is simplified in this application to improve readability, and actual implementation(s) can exhibit more complex behavior, such as parallel execution, blocking calls, spawning of additional software calls, and/or recursive calls, among others.

These software modules can be updated as needed by software developers, usually in a development environment, then validated in a testing environment, prior to being used in a production environment, i.e., as part of a software development life cycle (SDLC) process. In order for the component to be used in the production environment, it is typically propagated and installed on any production machines, e.g., virtual machines, servers, computers, etc. A component can refer to a software module, a linked-to library, an API, and/or a communication protocol, among others. Software failures (in operation of the software stack) can occur during an initial development environment, the testing environment, and/or the production environment. Failure tools can be used to help with identifying, storing, and/or managing these software failures such that they can be remediated during any part of the SDLC process.

Failure tools can be used to obtain failure data including call stacks on any software failures (i.e., failed software calls) on software calls into software stacks. A failure tool can generate such a call stack which can include information on what software module and what function of that module was called. Each logged module and function pair can be referred to as a frame of the call stack for that failed software call. A call stack can include tens, hundreds, thousands, or more of such frames for each failed software call. This discussion also refers to stack traces, which can be understood as snapshots of a software call through a software stack. A stack trace can reflect a state of the call stack at a certain time during the software call being propagated.

Different failure tools can be used at different stages of the SDLC process, e.g., one failure tool can be used during the development phase (i.e., in the development environment), another failure tool can be used during the testing phase, and yet another failure tool can be used during the production phase. In addition, multiple failure tools can be used during each phase itself. For example, a first failure tool can be used for monitoring a first stack associated with merchant functionality in the production phase, a second failure tool can be used for monitoring a second stack associated with customer functionality in the production phase, and a third failure tool can be used for monitoring certain portions of the common software stack in both the testing and the production phase. Additional failure tools can be used for use for support functionality when interfacing with the software stack during the production phase.

In some embodiments, predictive failure software can be used for predicting software failure characteristics. The predictive failure software can access failure data and context data related to a failed software call into a software stack. The failure data indicates software call information. The context data indicates characteristics including functionality of the failed software call. The predictive failure software can access cluster data on previous submissions of software failures. The cluster data can include software call traces including a first call trace associated with a first software call. The cluster data can be generated based on failure data provided by various failure tools including first and second failure tools. The cluster data can indicate software calls made through respective instances of the software stack for each of the software call traces. The predictive failure software can correlate the failed software call trace to a particular software call trace of the plurality of software call traces of the cluster data, where the correlating can be performed based on analysis of clusters indicated by the cluster data, the failure data, and the context data.

In some embodiments, predictive failure software can be used for determining failed software calls based on user functionality and associated failure data. The predictive failure software can receive a failure request from a user device, where the failure request indicates a user functionality and associated failure data. The predictive failure software can determine an issue based on the failure request, where the determination can be based on accessing failure tools using the user functionality and the failure data. The predictive failure software can access cluster data on failed software calls into a software stack. The cluster data can be generated based on failure data provided by failure tools. The cluster data can indicate software calls made through respective instances of the software stack for each of the software call traces, as well as context (including characteristics) of each of the software calls. The predictive failure software can determine a correlated failed software call that corresponds to a certain one of the software call traces. The predictive failure software can make this determination based on characteristics of the first issue and respective characteristics of each of the plurality of software call traces. The following description and associated Figures illustrate various embodiments directed to the ideas listed above.

Figure 1:
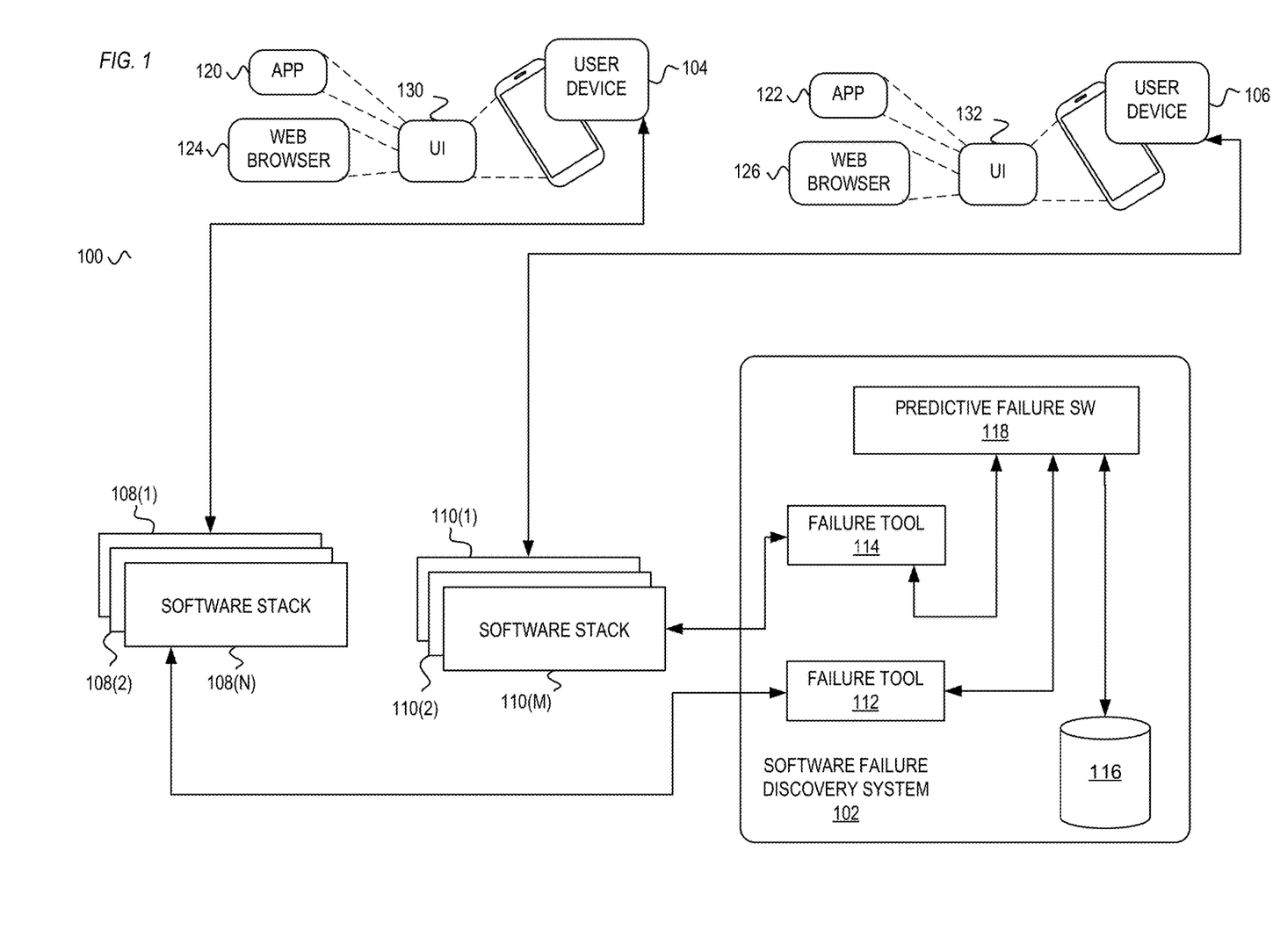
FIG. 1 is a system diagram illustrating embodiments of a software failure discovery system coupled with user devices.

FIG. 1 is a system diagram 100 illustrating embodiments of a software failure discovery system coupled with user devices. In some embodiments, the software failure discovery system 102 can predict software failure characteristics of failed software calls, such as software calls initiated by the user devices 104 and/or 106. In some embodiments, the software failure discovery system 102 can determine failed software calls based on user functionality and associated failure data provided by the user devices 104 and/or 106.

As shown in FIG. 1, a software failure discovery system 102 can interface with instances of software stacks 108(1), 108(2) through 108(N) (referred to collectively as the software stack 108). Similarly, the software failure discovery system 102 can interface with instances of software stacks 110(1), 110(2) through 110(M) (referred to collectively as the software stack 110). The system diagram 100 illustrates a production phase of the SDLC process, although development and/or testing phases can operate in a similar manner, as discussed.

The software stacks 108 and 110 can be hosted by one or more servers. In some embodiments, one or more portions of the software stacks 108 and/or 110 can be distributed over one or more servers and/or devices. The software failure discovery system 102 can be hosted by one or more servers, which may be the same servers as ones hosting the software stacks 108 and/or 110. In some embodiments, one or more portions of the software failure discovery system 102 can similarly be distributed over one or more servers and/or devices.

A software call can be to access certain functionality of a customer for a user account that is serviced by the software stack 108. A software call can be for accessing certain functionality of a merchant for a merchant account that is serviced by the software stack 110. A software call can be for a transaction between multiple entities. A software call can be initiated based on user input, which can originate at any number of devices (e.g., at the user deice 104) and/or other software systems.

The user device 104 and/or 106 can be any type of a computing device that can initiate software calls into the software stacks 108 and/or 110. The user devices 104 and/or 106 can be implemented using electronic devices, such as discussed below with reference to FIG. 7. The user device 104 includes a user interface (UI) 130 through which the user can interact with displayed user experiences. The user device 104 can generate and communicate the user request to the software stack 108. The user can access the UI 130 via an app 120 and/or via a web browser 124. Similarly, the user device 106 includes a user interface (UI) 132, accessible via an app 122 and/or via a web browser 126, through which a user can interact with user experiences. The user device 106 can generate and communicate a software call (that corresponds to the user request) to the software stack 110.

In one embodiment, a payment system (not shown) can be implemented using the software stack 108 and/or 110. The payment system can be for processing transactions, such as payments and/or order fulfilments. The payment system can perform risk analysis on the services to determine whether or not to perform the service and/or process a payment for the service. The payment system can include payment accounts, each of which can be associated with a buyer or a seller. The payment system can process payments from the user account that is associated with the user device 104. The payment system can provide financial services, such as a fund transfer (e.g., a transfer of a certain monetary amount), to the users of the user devices 104 and/or 106. For example, a buyer (e.g., a user of the user device 104) can be associated with one payment account, and the seller (e.g., a user of the user device 106) can be associated with another payment account at the payment system. Upon successfully performing the risk analysis on the requested service (e.g., a requested transaction at the tenant), the payment system can then perform a fund transfer from the buyer's payment account to the seller's payment account. The payment system can be implemented by PAYPAL or another online payment system that allows users to send, accept, and request fund transfers.

The predictive failure software 118 can receive failure data and context data from various failure tools. As shown, the software failure discovery system 102 can include failure tools 112 and 114 which monitor propagation of software calls through the software stacks 108 and 110, respectively. The failure tool 112 can be used for monitoring the stack 108 associated with customer functionality in the production phase. The failure tool 114 can be used for monitoring the stack 110 associated with merchant functionality in the production phase.

The failure data can include the call stacks and any associated reference numbers of the failed software traces for each failure tool. In some embodiments, the reference numbers are unique to each failure tool, thus indicating various failed software traces for a domain specific to that failure tool. The context data (which can be associated with the call stacks) can include information on the failed software traces, associated user experience, intended functionality, server(s) hosting the appropriate software stack(s), data on user device(s) initiating the respective software call, and/or other information regarding the software calls. The predictive failure software 118 can perform clustering analysis using the failure data and the context data to cluster the failed software traces into cluster data. The predictive failure software 118 can perform correlation analysis on any new failed software calls (or issues, depending on use cases) to find best fitting failed software cluster. The correlation analysis can be based on the failure data and/or the context data of the new failed software call, as compared to the cluster data. Depending on the best fitting failed software cluster, the predictive failure software 118 can then initiate appropriate remedies.

The predictive failure software 118 can generate the cluster data 116 based on failure data on previous software call traces, as provided by failure tools 112 and/or 114. The cluster data 116 can include context data including historical data on software calls made through instances 108(1)-108(N) of the software stack 108 and/or instances 110(1)-110(M) of the software stack 110. The predictive failure software 118 can access failed software call traces associated with failed software calls that originated at the user device 104 and/or 106.

The predictive failure software 118 can correlate a current failed software call trace to certain previous software call traces that are stored by the cluster data 116. The predictive failure software 118 can make this correlation based at least on analysis of clusters of the cluster data 116, including context data. The cluster data 116 can indicate failure data related to current and/or previous failed software calls into software stacks 108 and 110. Certain embodiments of this correlation and clusters of the cluster data are discussed below with relation to FIG. 3.

In some embodiments, the predictive failure software 118 can be used for determining failed software calls based on user functionality and associated failure data. The predictive failure software 118 can receive a failure request from the user device 104. The failure request can indicate context such as user functionality, e.g., a certain customer transaction such as intent to purchase and pay for an item that is offered by a merchant. The failure request can indicate associated failure data, which can include a state of software executing on the user device 104 (e.g., an app 120 or a web browser 124), and/or any debugging data passed back from the software stack 108 for the failed software call.

The software stack 108 is shown as including various instances 108(1)-108(N), which can indicate a state of the software stack 108 at a particular point in time. Since a state of the software stack 108 can change dynamically and at any time, a same software call made from the same user device 104 at two different points in time can have two related yet different software call traces. For example, a software call made at time t1 for a certain user transaction via the app 120 of the user device 104 can be made through a first instance of the software stack 108(1). Before a second software call is made at time t2, the software stack 108 can be updated to software stack instance 108(2) to revise several software modules and/or include a different way to store and access user data. Thus, although the software calls are made in the same way, the actual software traces are made through two related yet different software stacks 108(1) and 108(2). Thus, the failed software calls, although both associated with the same functionality, can be associated with separate issues, separate call traces, and separate failures.

The predictive failure software 118 can access the cluster data 116 to determine a correlated failed software call that corresponds the failed software calls (e.g., the failed software calls at t1 and/or at t2). The predictive failure software 118 can make this determination based on failure data (e.g., debugging information) and context data (e.g., characteristics of the respective issue and functionality). The following description and associated Figures illustrate various embodiments directed to the ideas listed above.

Figure 2:
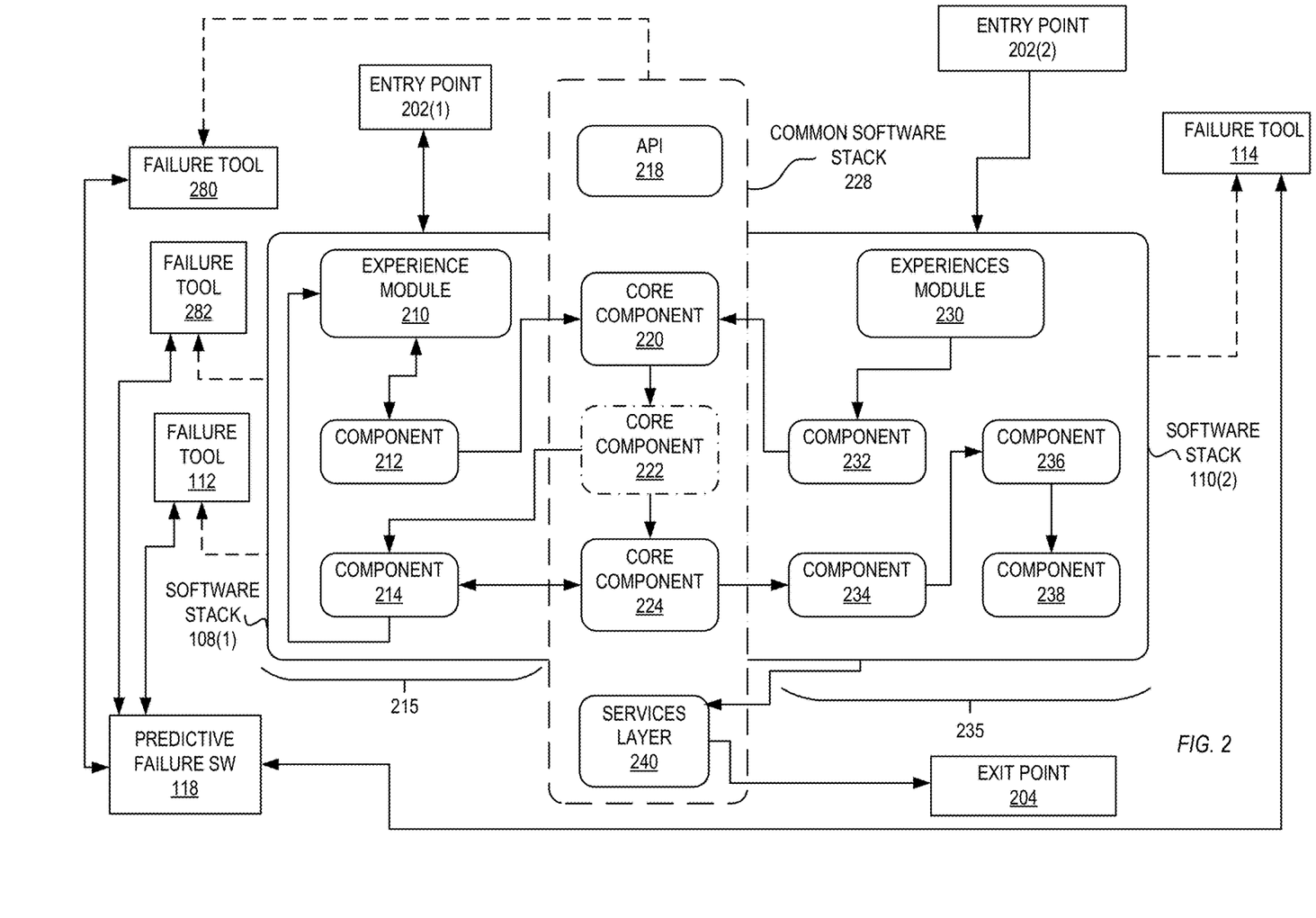
FIG. 2 is a system diagram illustrating embodiments of communication between entry/exit points and software stack components, as monitored by various failure tools.

FIG. 2 is a system diagram illustrating embodiments of communication between entry/exit points and software stack components, as monitored by various failure tools. FIG. 2 shows embodiments of operation of elements of the software failure discovery system 102 when monitoring various stack instances. FIG. 2 illustrates elements of certain instances of the software stacks 108(1) and 110(2). Each of the software modules 210-240 of FIG. 2 can include one or more functions that can be executed as part of a software call. FIG. 2 also illustrates entry points 202(1) and 202(2) via which software calls can be made into the software stacks 108 and 110, as well as an exit point 204 through which some software calls can finalize. Failure tools 112 and 114 are coupled to the software stack instances 108(1) and 110(2), respectively.

The failure tools 112 and/or 114 can determine and log where a software call has failed, including a calling module and function, and details on what module and function has failed. The failure tools can log associated context, e.g., information on how the software call has originated, e.g., details about a corresponding entry point including intended functionality and/or user experience. In some embodiments, the failure tools can also track changes to the software stack(s). For example, a change of the customer specific stack portion 215 can be tracked by the failure tool 112, whereas a change in the common software stack 228 can be tracked by a common software stack failure tool 280. Similarly, a change of a merchant specific stack portion 235 can be tracked by the failure tool 114. The failure tool 112 can monitor the operation of the software stack instance 108(1). The failure tool 112 can indicate a failure at any of the components 210-214 and/or at one of the common software stack 228 components. In some embodiments (e.g., without the common software stack failure tool 280), the failure tool 112 can also monitor the operation of the common software stack 228. In some instances, the failure tool 112 can simply log software call failures, e.g., as provided by an operating system or other components.

As discussed herein, the software stack instance 108(1) can include a customer specific stack portion 215 and a common software stack 228. In some instances, software failures of the common software stack 228 are tracked by a separate common stack failure tool 282. The customer specific software stack 215 can include an experience module 210 and components 212 and 214. The software stack instance 108(1) can also include a common software stack 228 that includes an application programming interface (API) 218, core components 220, 222, and 224, as well as a services layer 240. As shown, the software call originates at the entry point 202(1), which can be a call from the app 120. The software call can then propagate through the experience module 210, which can then call component 212. The component 212 can call the core component 220, which then can call core component 222, which can call component 214. In this example, upon completion of the function called in component 214, the component 214 can call the experience module 210 which in turn can communicate with the entry point 202(1) (e.g., to provide a visual indication of completion of the initial software call and/or information for consumption by the app 120).

The software stack instance 110(2) includes a merchant specific software stack 235 which can include an experience module 230 and components 232, 234, 236, 238. The software stack instance 110(2) also includes the common software stack 228, i.e., the portion of the software stack that is shared with the software stack instance 108(1). In this example, another software call (referred to as a "merchant software call") originates at the entry point 202(2), which can be a call from the web browser 126. The merchant software call can then propagate through the experience module 230, which can then call component 232. The component 232 can call the core component 220, which can call the core component 222, then can call core component 224. The core component 224 can call component 234, which can call the component 236 and component 238. For this merchant software call, the service layer 240 can be called, which then calls the exit point 204, which can provide data for consumption by the web browser 126 and/or another software subsystem for additional merchant-side functionality that may use a separate software stack.

As discussed above, one or more of the modules of the software stack can be revised to provide updated functionality. A change in the software stack can result in a new instance of that software stack. Thus, each time a module is changed (such as having source code changes and then being recompiled to a new executable), a new instance of that stack can be accessed by software calls that originate at the same entry point. In another example, an open source library that is linked to by a component is updated. A recompilation of that software module (i.e., with the new library) can also result in a new instance of that software stack.

The failure tool 114 can monitor the operation of the software stack instance 110(2). The failure tool 114 can indicate a failure at any of the components 230-238 and/or at one of the common software stack 228 components. In some embodiments (e.g., without the common software stack failure tool 280), the failure tool 114 can also monitor the operation of the common software stack 228. In some instances, the failure tool 114 can simply log software call failures, e.g., as provided by an operating system or other components. The failure tool 114 can also annotate each failure with context, e.g., additional information regarding user experience on a user machine from which the software call can be initiated.

For the above examples, the failure tools 112 and 114 can detect failures in software call traces for software calls originating at the entry points 202(1) and 202(2), respectively. Upon detection of a failure, the appropriate failure tool 112 or 114 can log details about the failure, including the call stack which includes identifiers for each of the modules and a function at that module that are called in the software call trace. For example, if a failure occurred at the component 214, the logged call stack (as logged by the failure tool 112) would include the modules 210, 212, 220, 222, 224, and 214, with corresponding calling functions (e.g., function 1 at the experience module 210) and the called function (e.g., function 2 at the component 212).

The failure tool 112 can also provide a reference number for all of the failures logged by the failure tool 112. The failure tool 112 can then communicate with the predictive failure software 118 to provide all of the failure data, and in some embodiments including reference numbers that are used within the scope of the failure tool 112. Similarly, the failure tool 114 can log context including any issues provided by the user device from which the software call is initiated, such as what can be received from the user of the user device and/or from the UI (e.g., the UI 130) indicating an issue with the UI, which can be outside of the software stack. The failure tool 114 can then communicate with the predictive failure software 118 to provide all of the failure data, and in some embodiments including reference numbers that are used within the scope of the failure tool 114. The predictive failure software 118 can then perform clustering analysis on the failure data and/or the context data from various failure tools to generate cluster data, as discussed below. The predictive failure software 118 can also perform correlation analysis using the cluster data on a new failed software trace and/or customer issue.

Figure 3:
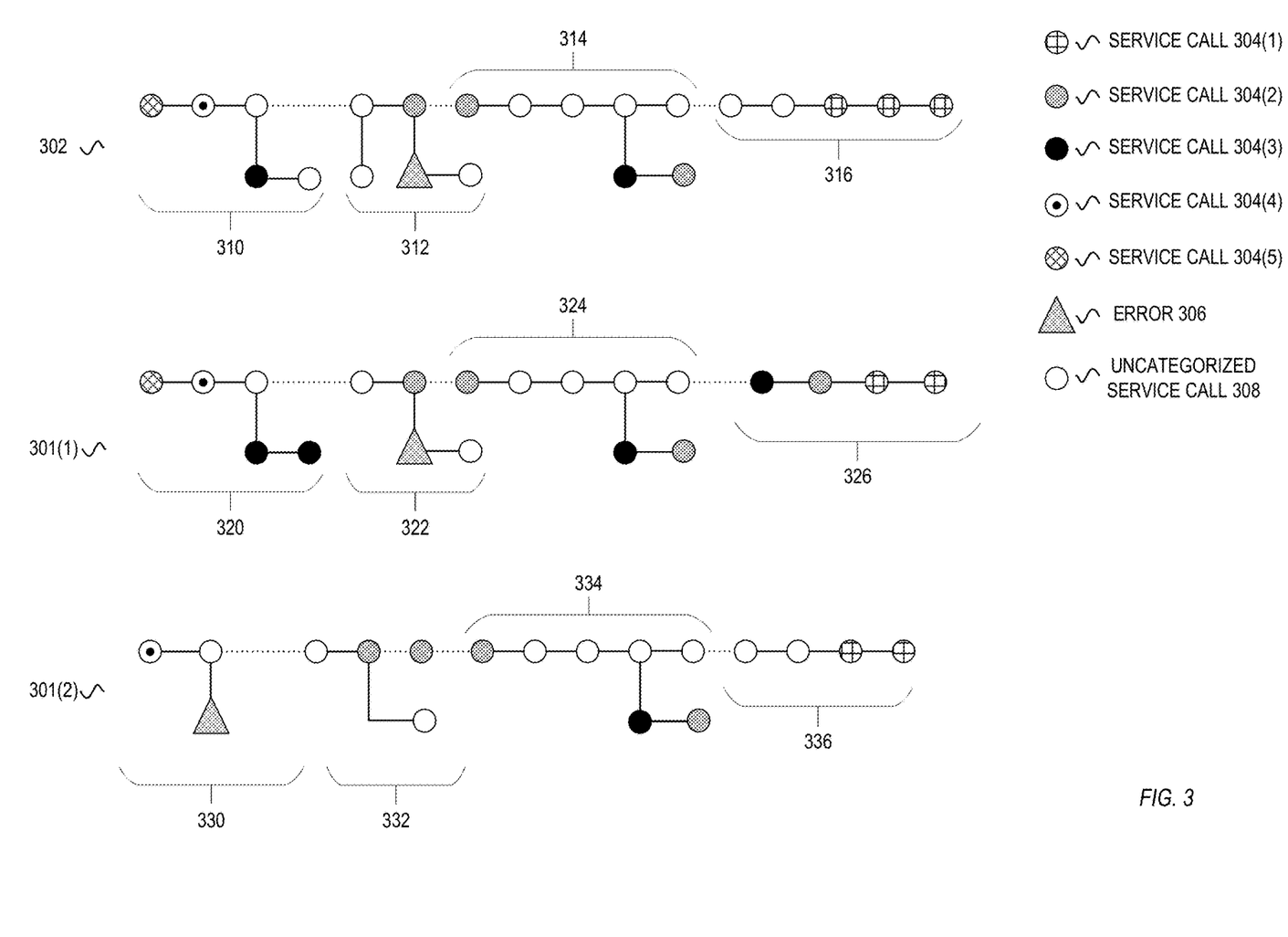
FIG. 3 is a diagram illustrating visualizations of software call traces for identifying failed software calls.

FIG. 3 is a diagram illustrating visualizations of software call traces for identifying failed software calls. FIG. 3 shows call traces 301(1), 301(2), and 302 that can represent the software calls into the software call stacks 108 and 110 of FIGS. 1 and 2. The call traces 301 (i.e., referring to both call traces 301(1) and 301(2)) and 302 can indicate call stacks for three separate failed software calls. In the example shown, the call traces 301 are previous failed software calls that have been analyzed and clustered (a process referred to collectively as clustering analysis) by the predictive failure software 118. The call trace 302 can be a current trace call that is being analyzed and compared (e.g., by using correlation analysis) to the clustered call traces 301. The predictive failure software 118 can receive a customer issue and can correlate the issue to a certain cluster. The predictive failure software 118 can thus access the cluster data based on the customer issue, without having access to an underlying failed software trace.

In some embodiments, the software call traces of FIG. 3 are example visualizations of results of the clustering analysis performed by the predictive failure software 118. In some embodiments, these visualizations can be displayed on a UI of a user device, such as the UI 130 of the user device 104. The visualizations can indicate five most common service calls 304(1)-304(5) (e.g., that can correspond to certain functions being called in certain modules, such as modules 210-240 of FIG. 2), where these top service calls are used in the clustering analysis. The visualizations can indicate an error 306 for a software failure during execution of the respective software call. The visualizations can indicate an uncategorized service call 308 for a service call that is not one of the top five service calls. It is noted that the number of top service calls is for exemplary purposes only, as in other instances another amount may be used for the clustering analysis.

In some embodiments, a number of the top service calls is dynamically determined by the predictive failure software 118, such as based on a number of modules and/or functions that are common among a certain sample size of logged service calls (i.e., associated with failed software calls). The predictive failure software 118 can group portions of the software call trace 301(1) into portions 320, 322, 324, and 326. Each of the portions can indicate frames of a certain portion of a call stack. For example, the portion 320 illustrates a first service call 304(1) followed by a service call 304(4), followed by uncategorized service call 308, followed by service calls 304(3). Similarly, the predictive failure software 118 can group portions of the software call trace 301(2) into portions 330, 332, 334, and 336. The predictive failure software 118 can group portions of the software call trace 302 into portions 310, 312, 314, and 316. The clustering analysis can examine similarity of each corresponding portion to another (e.g. portion 310 to portions 320 and/or 330), as well as examine the associated context data for each software call trace and/or each portion.

The clustering analysis may be performed for service calls that originate from the same entry point. For example, all three software call traces can be originated at the entry point 202(1), but be executed through different instances of the software stack 108, such as the software stack 108(1), 108(2), and 108(3). Each stack instance can have a different version of modules in the portion 215, in the common software stack 228, and/or a different set of modules that accomplish the same function. The clustering analysis can use the failure data and well as the context data associated with the software call traces.

The three software traces may be each be received from a different failure tool. For example, each of the software traces 301(1), 301(2), and/or 302 may be logged by three separate failure tools, even though all three software traces call the same functionality, such as a certain customer-centric functionality that is provided by the software stack 108. In this example, each of the software traces would have a different reference number (e.g., that are unique for that particular failure domain of that failure tool) that can be particular to a given failure tool (e.g., failure tools 112, 280, and 282). For example, the software trace 301(1) can be received (by the predictive failure software 118) from a failure tool in the development or testing phase. The software trace 301(2) can be received from a failure tool 114 in the production phase. The software trace 302 can be received from a failure tool 112 in the production phase.

The predictive failure software 118 can perform the clustering analysis on the software traces 301(1) and 301(2), along with other software traces. The clustering analysis can apply one or more clustering algorithms to cluster software traces with similar results based on a variety of characteristics. The predictive failure software 118 can, upon receiving a new software failure from any of the failure tools, access the failed software trace of the failed software call. In some embodiments, the predictive failure software 118 can also examine related software issues to determine whether any software stack changes have resulted in a different software issue having a better correlation match from the initially indicated software issue. Thus, in some instances, the predictive failure software 118 can first find a collection of similar clustered call stacks that may be categorized based on other characteristics than the underlying software issue. The collections of clustered call stack can then be analyzed to determine a cluster of call stacks that best correlate to the failed software trace.

The predictive failure software 118 can apply a clustering algorithm that fits the failed software call traces into specific clusters. The failed software call traces can be fit into specific clusters based on failure data including the call stack of each failed software call as well as context data such as information about API calls and/or web pages visited by the user (e.g., via the app 120 and/or the web browser 124 corresponding to the entry point of the respective failed software call). The failed software call traces can be fit (e.g., by predictive failure software 118) into specific clusters based on similar information for any downstream processing of the failed software call (if able to downstream process with the indicated failure).

The failed software call traces can be fit into specific clusters using information from additional failure tools and/or monitoring tools that are separate from the failure tool used to obtain the call stack for the failed software call. The additional failure tools and/or monitoring tools can include information from a Failed Customer Interaction tool (FCI) and/or Customer Flow based Test tools (CFBT). Data from the FCI can indicate failed customer interaction at the respective UI (e.g., the UI 130) for the associated failed software call, i.e., during the production phase. Data from the FCI can indicate issues with customer intended interactions at various portions of each transaction. Thus, a correlation of a software failure from the FCI system indicating customer issues with a software failure detected by a failure tool can be very helpful in identifying, tracking, and mitigating such software failures, including when using the predictive failure software 118 to find related software failures based on customer issues.

Data from the CFBT can indicate issues with various tests that are typically performed in the development and/or quality control phases. Thus, data from the CFBT can also include the call stack and associated API and web pages, just during non-production phases of execution of the software stack. In some cases, failures spotted at CFBT can be partially resolved or have a false positive of being resolved. Thus, a correlation of a software failure from the CFBT (as detected during the development and/or testing phase) with a software failure detected during the production phase can be very helpful in identifying, tracking, and mitigating such software failures.

The predictive failure software 118 can cluster data points using not only the call stack for each failed software call, it can also include information about API calls or WEB page visited by the user which can be fetched using PayPal tools (FCI—Failed Customer Interaction, CFBT—Customer Flow based Test tools) which is utilize to categorize and utilized for predicting the sub-flows which are impacted.

In some embodiments, the predictive failure software 118 can use a first clustering algorithm to determine an optimal number of clusters needed for each type of software failure. The predictive failure software 118 can use a second clustering algorithm to determine the clustering into the optimal number of clusters.

The first clustering algorithm can access call stack information which can contain information about the components being called with a number of occurrences. The first clustering algorithm may be a data clustering algorithm that groups points together that are closely packed together. The first clustering algorithm may be a density-based spatial clustering of data points (which can be based on various characteristics such as the error condition). In some embodiments, the first clustering algorithm can be a density-based spatial clustering of applications with noise (DBSCAN) algorithm. The processing by the first clustering algorithm can be dependent on such as a minimum number of points required to form a dense region. The processing by the first clustering algorithm can be dependent on distances between any two different clusters. Based on the minimum number of points, the first clustering algorithm can determine the number of clusters for the data on a given issue.

The second clustering algorithm may be a data clustering algorithm that builds a hierarchy of clusters using either a bottom-up or divisive (i.e., top down) approaches. The second clustering algorithm can bucketize the data (i.e., the data used by the first clustering algorithm) into the specified number of clusters (i.e., as determined by the first clustering algorithm).

For example, the first clustering algorithm can be applied to data on a certain customer issue such as an error in a checkout procedure by the customer at the app 120. The data can include several data subsets from various tools. The data can include CFBT data (e.g., from the CFBT tool) that indicates twenty separate issues and various characteristics of each occurrence of each issue, including the call stack. The CFBT data also includes CFBT reference numbers that identifies each error in the CFBT system. The data can also include FCI data for previous software calls on any issues related to the checkout procedure. The FCI data can include FCI reference numbers that identifies each error in the FCI system. The data can also include failure tool data for previous software calls on any issues related to the checkout procedure. The failure tool data can include failure tool data for each software stack instance that identifies each such error in that failure tool system. The data can also include the related API and web call data for each of these three data subsets.

Upon applying the first clustering algorithm to the data, the result can indicate that the data for the particular checkout flow can be split into a certain number of separate clusters. This result can be fed into the second clustering algorithm, which can determine hierarchical clustering of the data into the ten clusters. This result can be referred to as cluster data. The predictive failure software 118 can then use the cluster data to perform various software failure predictive functions.

Once the clustered data is determined, the predictive failure software 118 can perform correlation analysis for a new software issue and/or a new failed software trace to determine a closest fitting cluster of software failures. The closest fitting cluster of software failures can be used to better mitigate the software failure. For example, based on the analysis of the cluster of the software failures in the determined cluster, the predictive failure software 118 can determine that the software issue is already being addressed, e.g., which could have been initiated by a previous detection of the software issue from a report from another failure tool. The predictive failure software 118 can notify the separate failure tool (i.e., that provided the software issue already being addressed) and indicate additional information about the failure and/or raise a priority level indicating urgency required to fix the failure.

Figure 4:
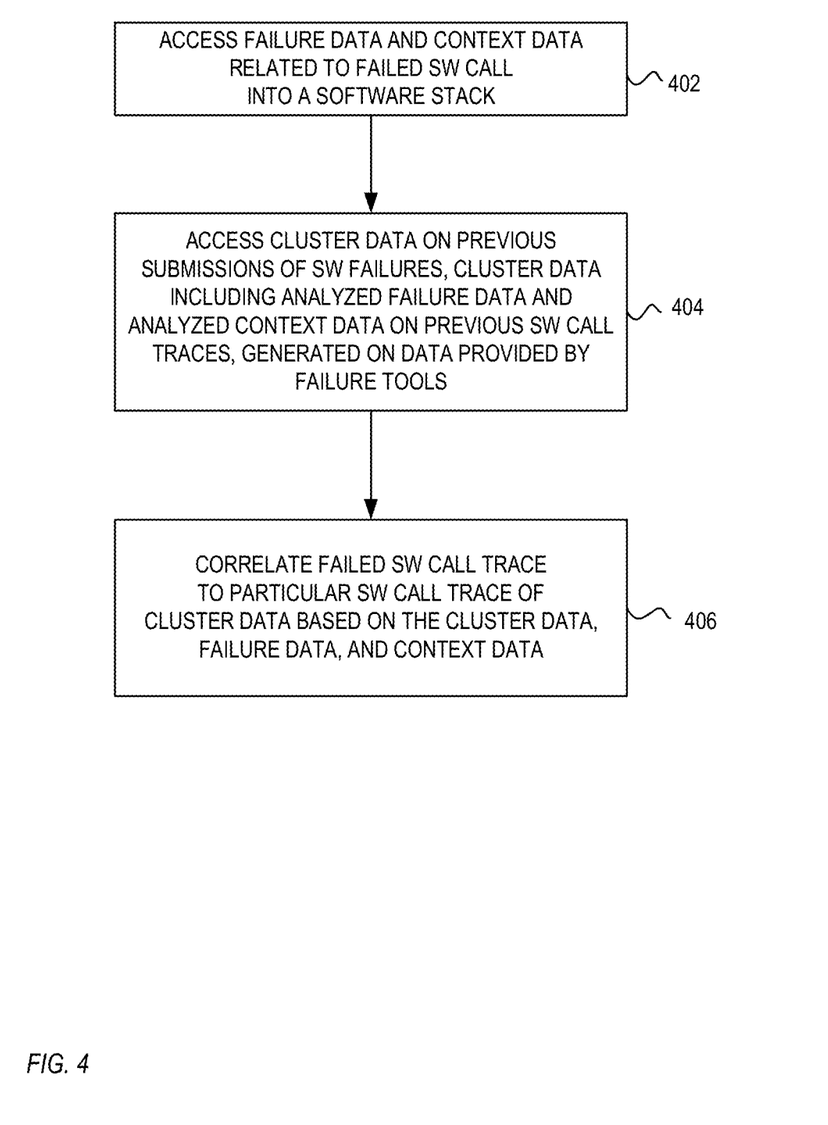
FIG. 4 is a flow chart illustrating embodiments of operations for using the software failure discovery system.

FIG. 4 is a flow chart illustrating embodiments of operations for using the software failure discovery system. The method of FIG. 4 is described with reference to the systems and components described in FIGS. 1-3 (for illustration purposes and not as a limitation). The example operations can be carried out by the predictive failure software 118.

Beginning with 402, the predictive failure software 118 can access failure data and context data related to a failed software call into a software stack. The failed software call can be for accessing a first functionality provided by a first subset of the software stack. The software call traces can be monitored by various failure tools. The second failure tool can be associated with one or more of the first functionality or the first subset of the software stack.

At 404, the predictive failure software 118 can access cluster data that includes analyzed failure data and analyzed context data on previous submissions of software failures. The cluster data can include software call traces. The cluster data that has already been created using data received from multiple failure tools. The software call traces can be grouped into clusters. In some embodiments, each of the clusters can be associated with context data such as respective issues and respective tags. Each of the issues can indicate a respective problem type for the respective failed software call. Each of the tags can indicate a user reaction associated with the respective failed software call.

The first failure tool can be usable for a first user call in a first context. The failure tools can include a third failure tool usable for a second user call in a second context. The first failure tool and the third failure tool can generate failure reference numbers that reference separate failure domains.

The predictive failure software 118 can normalize the instances of the software stack, including the first instance of the software stack and the second instance of the software stack, to a common plurality of failure data points. Normalizing can include determining a respective internal API calls and respective external API calls made for each of the first instance of the software stack and the second instance of the software stack. A common plurality of failure data points can indicate common instances of the plurality of internal API calls and common instances of the external API calls.

The first instance of the software stack can include a first module subset of a first plurality of available software modules at a first point in time. The second instance of the software stack can include a second module subset of a second plurality of available software modules at a second point in time. In some embodiments, the first module subset is hosted by a first server. The second module subset can be hosted by a second server that is different from the first server. The clustering can be based on context data that indicates characteristics of the first server and of the second server. For example, certain failures can be exhibited only by the second server for call traces and context data that is otherwise substantially similar.

At 408, the predictive failure software 118 can correlate the failed software call trace to a particular call trace of the cluster data, which can be based on cluster data, failure data, and context data. The first instance of the software stack can include a subset of a first plurality of available software modules at a first point in time. The second instance of the software stack can include a second subset of a second plurality of available software modules at a second point in time. The first module subset can be accessed via the first entry point that originates at a first user device running the first module subset. The second module subset can be accessed via the second entry point that originates at a second user device running the second module subset. The correlating can be further based on context data that can include characteristics of the first user device and the second user device, the server(s) hosting the respective software stacks, and/or other characteristics discussed above.

In some embodiments, the predictive failure software 118 can perform various remedy actions. The remedy actions can include providing information on the correlated failed software call and a failure domain of a failure tool associated with the correlated failed software call. The remedy actions can include raising a priority on the correlated failed software call by accessing a failure domain of a failure tool associated with the correlated failed software call.

Figure 5:
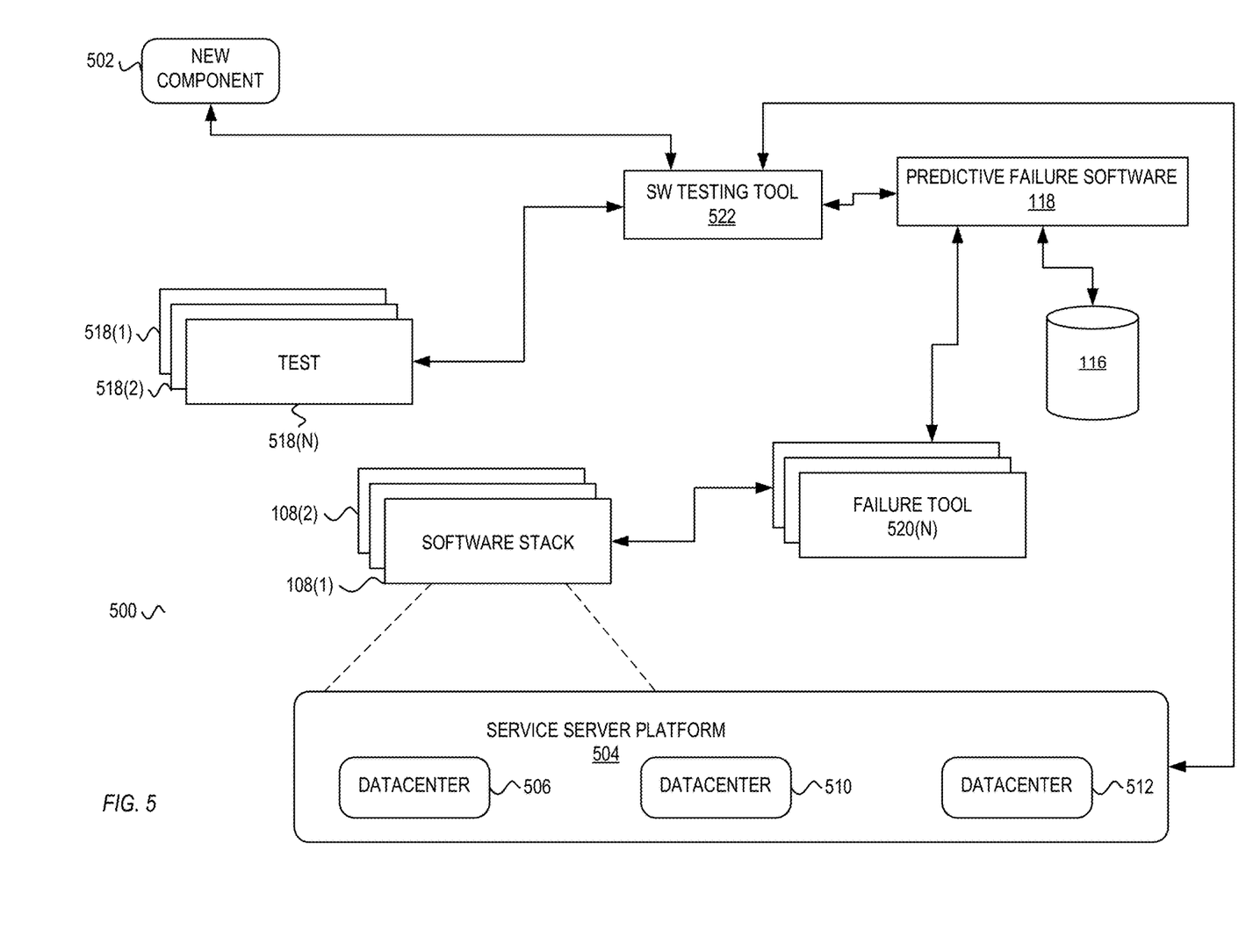
FIG. 5 is a system diagram illustrating embodiments of a software failure discovery system used to triage a new component for use with an existing software stack.

FIG. 5 is a system diagram 500 illustrating embodiments of a software failure discovery system used to triage a new component for use with an existing software stack. FIG. 5 illustrates how a new component 502 can be tested by a software testing tool 522, including accessing the predictive failure software 118. In FIG. 5, a new component is being tested for being added to a software stack hosted by the data center 510 and/or 512 (e.g., in a production environment). The new component 502 can be first added and tested in a software stack that is hosted by the data center 506 (e.g., in a development and/or testing environments). The component can be a new module, a revised module, different linked-to libraries for the module (e.g., different dependencies), among others.

A software testing tool 522 can access the new component 502 that is being tested. The software testing tool 522 can access a software stack that is hosted by one or more servers at the datacenter 506. The software testing tool 522 can apply the tests 518(1) and 518(2) to the software stack. The software testing tool 522 can perform the tests 518 in a development or a testing phase of the SDLC process If the tests succeed with no failures, then the component 502 can be added into the production call stack(s) 108(2) that can be hosted by the data center(s) 510 and/or 512.

If the tests have one or more failures, then they can be logged by an appropriate failure tool of the failure tools 520(N). For example, the failure tool 520(1) can be used which is a CFBT tool that logs CFBT data on the failures. Another failure tool 520(2) can also be used that logs that failure data. The collected failure data from all the failure tools can be communicated to the predictive failure software 118.

The data can include CFBT data (e.g., from the CFBT tool) that indicates, for example, twenty separate issues and various characteristics of each issue, including a respective call stack associated with each issue. The CFBT data also includes CFBT reference numbers that identifies each issue in the CFBT system.

During testing of the new component 502, the predictive failure software can receive information from the software testing tool 522 regarding failure or passing of the test(s) 518 using the software stack 108. The software testing tool 522 can provide additional information regarding the tests 518 that include context such as user flow and other test parameters (which may or may not be provided by the failure tool(s) 520). The predictive failure software 118 can access the cluster data 116 for each new failure indicated by the software testing tool 522 and/or the failure tool(s) 520.

The predictive failure software 118 can use the cluster data 116 to determine clusters that match with each given failed software call. Thus, the failure in the development/testing environment can be helped out by using cluster data from the production and potentially any previous development/testing of related components. In some embodiments, the predictive failure software 118 can determine remediation steps based on a type of issue indicated by the cluster data 116. The issues can include an issue with the new component 502, issues with other components of the software stack (i.e., not the new component 502), an issue with a datacenter hosting the software stack being tested, among others.

In case the issue is with the new component 502, the software testing tool 522 can roll back the component 502 (and optionally other related and/or affected components) to an earlier version. The software testing tool 522 can log the software failure and any associated information with the predictive failure software 118. In case the issue is with other components of the software stack, the software testing tool 522 can log the software failure and any associated information with the predictive failure software 118, and optionally disable the test case that resulted in the issue. In case the issue is with the datacenter, the software testing tool 522 can indicate an alarm and/or mediate loss of any data on the datacenter 506.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIG. 5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
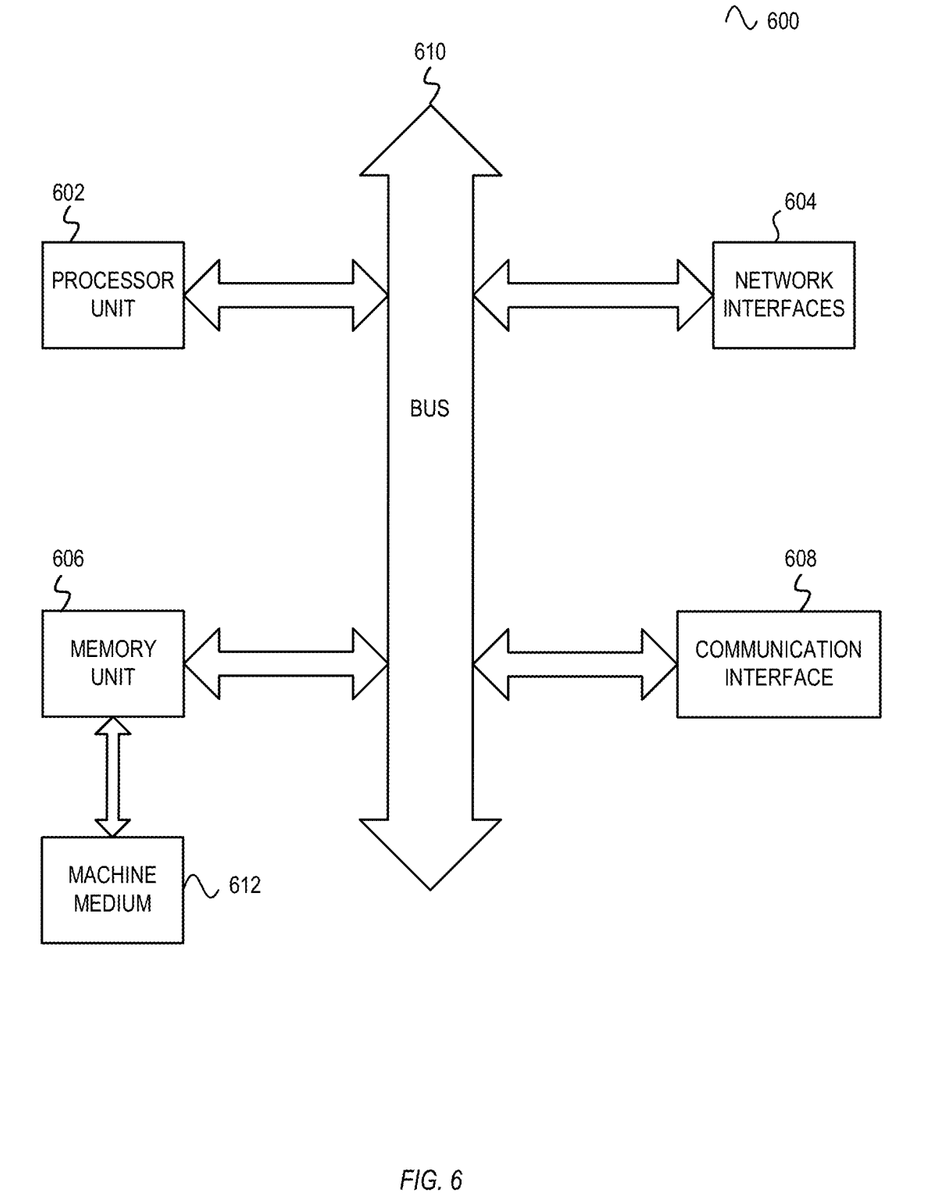
FIG. 6 is a block diagram illustrating embodiments of electronic devices used in the software failure discovery systems of FIGS. 1-5.

FIG. 6 is a block diagram of one embodiment of an electronic device 700 used in the communication systems of FIGS. 1-5. In some implementations, the electronic device 600 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 600 can include a processor unit 602 (possibly including multiple processors, multiple cores, multiple nodes, and/or implementing multi-threading, etc.). The electronic device 600 can also include memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include a bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The electronic device 600 includes a communication interface 608 for network communications. The communication interface 608 can include at least one of a wireless network interface (e.g., a WLAN interface, a Bluetooth interface, a WiMAX interface, a ZigBee interface, a Wireless USB interface, etc.), In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities that for predicting software failure characteristics. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, memory unit 606, the network interfaces 604, and the communication interface 608 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the present disclosure is not limited to them. In general, techniques for predicting software failure characteristics as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for predicting software failure characteristics, the method comprising:
    accessing failure data and context data related to a first failed software call within a first software stack, wherein the failure data indicates software call information, wherein the context data indicates characteristics including a functionality associated with the first failed software call and a first software call trace, wherein the first software call trace represents a first sequence of software calls within the first software stack leading to the first failed software call, and wherein the first sequence of software calls includes a first entry point into the first software stack and a first exit point out of the first software stack;

accessing cluster data on previous submissions of software failures, wherein the cluster data includes analyzed failure data and analyzed context data on a plurality of software call traces including a second software call trace, wherein the second software call trace represents a second sequence of software calls within a second software stack leading to second failed software call, wherein the second sequence of software calls includes a second entry point into the second software stack and a second exit point out of the second software stack, wherein the first software stack and the second software stack share a common sub-software stack, and wherein the first entry point and the first exit point are different from the second entry point and the second exit point, respectively;

correlating the first failed software call trace to the second failed software call trace based at least on analysis of clusters indicated by the cluster data, the failure data, and the context data; and transmitting, based on the correlating the first failed software call trace to the second failed software call trace, an alert to a device indicating failure data associated with the second failed software call.

2. The method of claim 1, wherein the plurality of software call traces are grouped into a plurality of clusters, wherein each of the plurality of clusters is associated with a respective plurality of issues and a respective plurality of tags, wherein each issue in the respective plurality of issues indicates a respective problem type for a respective failed software call, and wherein each tag in the plurality of tags indicates a user reaction associated with the respective failed software call.

3. The method of claim 1, wherein the first failed software call is for accessing a first functionality provided by the first software stack.

4. The method of claim 1, wherein the plurality of software call traces is monitored by a plurality of failure detection tools associated with different software stacks, wherein the first failed software call was detected by a first failure detection tool from the plurality of failure detection tools and the second failed software call was detected by a second failure detection tool from the plurality of failure detection tools.

5. The method of claim 4, wherein the plurality of failure detection tools further comprises a third failure detection tool usable for detecting failed software calls within a third software stack.

6. The method of claim 1,
wherein the context data further indicates an intended user experience associated with the first failed software call, and
wherein the analyzed context data indicates respective characteristics including a functionality associated with each of the plurality of software call traces.

7. The method of claim 1, further comprising:
normalizing the first software stack and the second software stack to a plurality of common failure data points, wherein the normalizing comprises determining a respective plurality of internal API calls and a respective plurality of external API calls made for each of the first software stack and the second software stack, and wherein the plurality of common failure data points indicates one or more common internal API calls and/or one or more common external API calls between the first software stack and the second software stack.

8. The method of claim 1,
wherein the first entry point corresponds to a first sub-software stack external to the common sub-software stack, and wherein the second entry point corresponds to a into the second sub-software stack external to the common sub-software stack.

9. The method of claim 8,
wherein the first sub-software stack comprises a first set of modules hosted by a first server,
wherein the second sub-software stack comprises a second set of modules hosted by a second server that is different from the first server, and
wherein the correlating is further based on first characteristics of the first server and second characteristics of the second server.

10. A system comprising:
a non-transitory memory storing instructions; and
one or more hardware processors coupled with the non-transitory memory and configured to execute the instructions to cause the system to perform operations comprising:
receiving a failure request from a user device, wherein the failure request includes first failure data indicating a first failed software call within a first software stack and a first call trace, wherein the first call trace represents a first sequence of software calls within the first software stack leading to the first failed software call, and wherein the first sequence of software calls includes a first entry point into the first software stack and a first exit point out of the first software stack;
determining a first issue associated with the failure request based on accessing one or more failure detection tools using the first failure data;
accessing cluster data including a plurality of software call traces, wherein the plurality of software call traces comprises a second call trace representing a second sequence of software calls within a second software stack leading to a second failed software call, wherein the second sequence of software calls includes a second entry point into the second software stack and a second exit point out of the second software stack, wherein the first software stack and the second software stack share a common sub-software stack, and wherein the first entry point and the first exit point are different from the second entry point and the second exit point;
determining a correlation between the first failed software call and the second failed software call based on characteristics of the first issue and respective characteristics of each of the plurality of software call traces; and
transmitting, based on the correlation between the first failed software call and the second failed software call, failure information indicating that the first failed software call is related to the second failed software call.

11. The system of claim 10, wherein the failure information further comprises data associated with the second failed software call.

12. The system of claim 10, wherein the operations further comprise raising a priority on the second failed software call by accessing a failure domain of a failure detection tool associated with the second failed software call.

13. The system of claim 10,
wherein the plurality of software call traces are grouped into a plurality of clusters, wherein each of the plurality of clusters is associated with a respective plurality of issues and a respective plurality of tags, wherein each of the plurality of issues indicates a respective problem type for the respective failed software call, wherein each of the plurality of tags indicates a user reaction associated with the respective failed software call, and wherein the determining the correlation comprises:

determining a particular cluster of the plurality of clusters based on one or more of a first tag and the first issue associated with the failure request, wherein the particular cluster comprises the second failed software call.

14. The system of claim 10, wherein the first issue is associated with a first failure domain; and wherein the second failed software call is associated with a second failure domain different from the first failure domain.

15. A non-transitory machine-readable medium having stored thereon machine-readable instructions executable to cause a machine to perform operations comprising:

accessing failure data related to a first failed software call within a first software stack, wherein the failure data indicates a first software call trace representing a first sequence of software calls within the first software stack leading to the first failed software call, and wherein the first sequence of software calls indicates a first entry point into the first software stack and a first exit point out of the first software stack;

accessing cluster data on previous submissions of software failures, wherein the cluster data comprises a plurality of software call traces including a second call trace representing a second sequence of software calls within the second software stack leading to a second failed software call, wherein the second sequence of software calls indicates a second entry point into the second software stack and a second exit point out of the second software stack, wherein the first software stack and the second software stack share a common sub-software stack, and wherein the first entry point and the first exit point are different from the second entry point and the second exit point, respectively; and correlating the first failed software first call to the second call trace of the plurality of software call traces of the cluster data, the correlating based at least on analysis of clusters of the cluster data.

16. The non-transitory machine-readable medium of claim 15, wherein the plurality of software call traces are grouped into a plurality of clusters, wherein each of the plurality of clusters is associated with a respective plurality of issues and a respective plurality of tags, wherein each of the plurality of issues indicates a respective problem type for a respective failed software call, wherein each of the plurality of tags indicates a user reaction associated with the respective failed software call.

17. The non-transitory machine-readable medium of claim 15, wherein the first failed software call is for accessing a first functionality provided by the first software stack, wherein the plurality of software call traces is monitored by a plurality of failure detection tools, and wherein a first failure tool from the plurality of failure detection tools used to detect the first failed software call is associated with the first functionality or the first software stack.

18. The non-transitory machine-readable medium of claim 17, wherein the first failure detection tool is usable for detecting software failures in a first context, wherein the plurality of failure detection tools comprises a second failure detection tool usable for detecting software failures in a second context, and wherein the first failure detection tool and the second failure detection tool generate failure reference numbers that reference separate failure domains.

19. The non-transitory machine-readable medium of claim 15, wherein the first entry point corresponds to a first sub-software stack external to the common software stack, wherein the first sub-software stack comprises a first module subset hosted by a first server, wherein the second entry point corresponds to a second sub-software stack external to the common software stack, wherein the second sub-software stack comprises a second module subset hosted by a second server, and wherein the correlating is further based on first characteristics of the first server and second characteristics of the second server.

20. The non-transitory machine-readable medium of claim 15, wherein the operations further comprise:

normalizing the first software stack and the second software stack to a plurality of common failure data points, wherein the normalizing comprises determining a respective plurality of internal API calls and a respective plurality of external API calls made for each of the first software stack and the second software stack, and wherein the plurality of common failure data points indicates one or more common internal API calls and/or one or more common external API calls between the first software stack and the second software stack.

\* \* \* \* \*